(12) United States Patent
Whitehead et al.

(10) Patent No.: US 11,538,354 B2
(45) Date of Patent: Dec. 27, 2022

(54) READING TEACHING AID

(71) Applicant: Kevin Scott Whitehead, Santa Rosa, CA (US)

(72) Inventors: Kevin Scott Whitehead, Santa Rosa, CA (US); Rebecca Kay Parenteau, Victoria (CA)

(73) Assignee: Kevin Scott Whitehead, Santa Rosa, CA (US)

(*) Notice: Subject to any disclaimer, the term of this patent is extended or adjusted under 35 U.S.C. 154(b) by 1218 days.

(21) Appl. No.: 16/006,351

(22) Filed: Jun. 12, 2018

(65) Prior Publication Data

US 2018/0366023 A1    Dec. 20, 2018

Related U.S. Application Data

(60) Provisional application No. 62/519,990, filed on Jun. 15, 2017.

(51) Int. Cl.
*G09B 17/00*    (2006.01)
*G09B 1/32*    (2006.01)

(52) U.S. Cl.
CPC ............... *G09B 17/00* (2013.01); *G09B 1/32* (2013.01)

(58) Field of Classification Search
CPC ............. G09B 17/00; G09B 1/00; G09B 1/32
See application file for complete search history.

(56) References Cited

U.S. PATENT DOCUMENTS

| | | | |
|---|---|---|---|
| 2001/0003039 A1* | 6/2001 | Marshall | G09B 1/02 434/167 |
| 2016/0063885 A1* | 3/2016 | Bishop | G09B 17/00 434/175 |

* cited by examiner

*Primary Examiner* — Robert J Utama
(74) *Attorney, Agent, or Firm* — Taylor English Duma LLP

(57) ABSTRACT

A method for using a reading teaching aid assembly includes aligning a vowel of a vowel card with a starting cell of a starting block, the starting cell defining a starting consonant; pronouncing the starting consonant and the vowel together; sliding the vowel card along a vowel track, the starting block and an ending block extending along the vowel track; aligning the vowel with an ending cell of the ending block, the ending cell defining an ending consonant; and pronouncing the ending consonant.

20 Claims, 13 Drawing Sheets

READING TEACHING AID

CROSS-REFERENCE TO RELATED APPLICATIONS

This application claims the benefit of U.S. Provisional Application No. 62/519,990, filed on Jun. 15, 2017, which is hereby incorporated by reference in its entirety.

TECHNICAL FIELD

This disclosure relates to reading teaching aids. More specifically, this disclosure relates to reading teaching aid assemblies comprising a board and a vowel card.

BACKGROUND

Some consonants define plosive consonant sounds. Plosive consonant sounds can be created by first forming a stricture of the mouth that allows no air to escape from the vocal tract, and second, compressing and releasing air to form the plosive consonant sound. Because of the formation of plosive consonant sounds, the plosive consonant sounds cannot be extended during pronunciation without adding a superfluous vowel sound. Many reading students subconsciously add the superfluous vowel sound without realizing it, which can form improper associations of superfluous vowel sounds with consonants defining plosive consonant sounds. For example, it can be difficult to pronounce the letter "d" alone without adding an "uh" superfluous vowel sound. Practicing the pronunciation of plosive consonants alone can cause a reading student to associate the "uh" sound with the letter "d", leading to mispronunciations of words such as "Duh-OG" instead of "DOG."

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a method for using a reading teaching aid assembly, the method comprising: aligning a vowel of a vowel card with a starting cell of a starting block, the starting cell defining a starting consonant; pronouncing the starting consonant and the vowel together; sliding the vowel card along a vowel track, the starting block and an ending block extending along the vowel track; aligning the vowel with an ending cell of the ending block, the ending cell defining an ending consonant; and pronouncing the ending consonant.

Also disclosed is a reading teaching aid assembly comprising a board, the board comprising a vowel track, a starting block extending along the vowel track, and an ending block extending along the vowel track; and a vowel card aligned with the vowel track.

Also disclosed is a board comprising a vowel track; a starting block extending along the vowel track; and an ending block extending along the vowel track.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
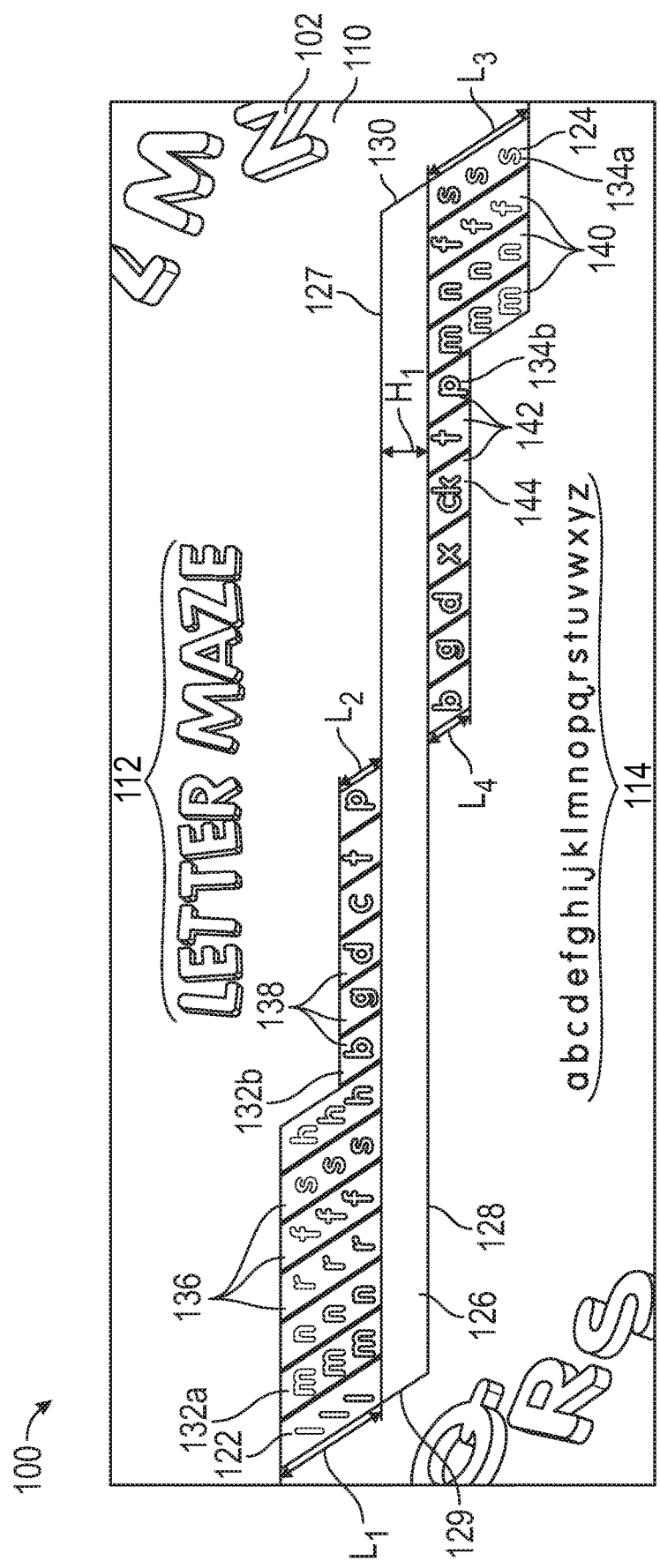
FIG. 1 is a top view of a first side surface of a board of a reading teaching aid assembly in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a reading teaching aid assembly and associated methods, systems, devices, and various apparatus. The reading teaching aid assembly can comprise a board and a vowel card. It would be understood by one of skill in the art that the disclosed reading teaching aid assembly is described in but a few exemplary embodiments among many. No particular terminology or description should be considered limiting on the disclosure or the scope of any claims issuing therefrom.

FIG. 1 is a top view of a board 102 of a reading teaching aid assembly 100. The board 102 can define a first side surface 110 and a second side surface 710 (shown in FIG. 7), and the first side surface 110 can be defined opposite from the second side surface 710. In the present aspect, the board 102 can comprise poster board; however, in other aspects, the board 102 can comprise plastic, metal, wood, cardboard, paper, ceramic, glass, or any other suitable material. In the present aspect, the board 102 can be coated, such as by a lamination process, with a material compatible with dry-erase or wet-erase markers, such as enamel, polyester, acrylic, vinyl, polypropylene, melamine, plastics, or any other suitable material.

In the present aspect, the board 102 can be sized for table-top or desk-top use, such as 7"×18" for example and without limitation. In other aspects, the board 102 can be sized to fit in a notebook, such as 8.5"×11" for example and without limitation. In some aspects, the board 102 can be sized to fit on common paper sizes, such as 8.5"×11", 8.5"×14", 11"×17", A3, A4, or any other suitable size. In some aspects, the board 102 can be sized for wall use, such as a poster, which can be attached to a wall or placed on an easel or stand. The dimensions of the board 102 should not be viewed as limiting, and the board 102 can define any dimensions.

The first side surface 110 of the board 102 can comprise title indicia 112 and support indicia 114. The title indicia 112 can recite a title of the reading teaching aid assembly 100, for example and without limitation, "Letter Maze." The support indicia 114 can recite information which can be helpful to a user 300 (shown in FIG. 3A). In the present aspect, the support indicia 114 can recite an alphabet, such as the English language alphabet. In other aspects, the support indicia 114 can recite an alphabet of another language, such as, for example and without limitation, Arabic, Greek, or any other suitable language. In other aspects, the support indicia 114 can recite other information which can be helpful to the user 300, such as directions, phonetic tables, words of encouragement, entertaining graphics such as cartoons, mnemonic devices, or any other suitable support indicia 114. Positions of the title indicia 112 and the support indicia 114 should not be viewed as limiting, and the title indicia 112 and the support indicia 114 can be depicted anywhere on the board 102. In some aspects, there can be a plurality of support indicia 114 portions; however in other aspects, the first side surface 110 may not comprise either or both of the title indicia 112 and the support indicia 114.

The first side surface 110 of the board 102 can comprise a starting block 122, an ending block 124, and a vowel track 126. In the present aspect, the starting block 122, the ending block 124, and the vowel track 126 can each be printed graphics; however, in other aspects, any or all of the starting block 122, the ending block 124, and the vowel track 126 can be physically defined by the board 102, such as being raised or carved into the first side surface 110. For example and without limitations, in some aspects, the vowel track 126 can be recessed into the first side surface 110.

In the present aspect, the vowel track 126 can be horizontally oriented. The vowel track 126 can define a top track side 127 and a bottom track side 128. The top track side 127 can be defined opposite from the bottom track side 128. The vowel track 126 can define a first height $H_1$ measured between the top track side 127 and the bottom track side 128. The vowel track 126 can define a left track side 129 and a right track side 130. The left track side 129 can be defined opposite from the right track side 130. In the present aspect, the vowel track 126 can be shaped as a parallelogram; however, in other aspects, the vowel track 126 can define a different shape, such as rectangular, elliptical, polygonal, or any other suitable shape.

The starting block 122 can extend along a portion of the top track side 127 proximate to the left track side 129. The starting block 122 can comprise a first starting sub-block 132a and a second starting sub-block 132b. In the present aspects, the first starting sub-block 132a and the second starting sub-block 132b can each be shaped as a parallelogram; however in other aspects, either or both of the first starting sub-block 132a and the second starting sub-block 132b can define a different shape, such as rectangular, elliptical, polygonal, or any other suitable shape.

The first starting sub-block 132a can comprise a plurality of first starting cells 136, each extending upwards from the vowel track 126 and towards the left by a first length $L_1$. In the present aspect, each of the first starting cells 136 can contain a consonant which can be extended or "stretched" during pronunciation. For example and without limitation, the first starting cells 136 can contain consonants corresponding to nasal, fricative, or affricate consonant sounds. The first starting cells 136 can contain the consonants "l", "m", "n", "r", "f", "s", and "h", for example and without limitation. In other aspects, the first starting cells 136 can contain other consonants such as "v" or "z". In some aspects, some or all of the first starting cells 136 can contain multiple letters corresponding to an extendable consonant sound, such as "th" or "sh" for example and without limitation.

The consonants "l", "m", "n", and "r" can each be voiced consonants which can be pronounced by producing vibrations in the user's voice box. The consonants "r", "f", "s" and "h" can be unvoiced consonants which can be pronounced without producing vibration in the user's voice box. In the present aspect, the voiced consonants can be placed within the first starting sub-block 132a proximate to the left side track 129 and before the unvoiced consonants. In other aspects, the unvoiced consonants can be placed within the first starting sub-block 132a before the voiced consonants. It can be desirable to separate the voiced consonants from the unvoiced consonants in order for the user 300 to identify and learn the different classifications of consonant sounds; however, in other aspects, the voiced consonants and the unvoiced consonants can be intermixed within the first starting cells 136 of the first starting sub-block 132a and may not be separated.

The second starting sub-block 132b can comprise a plurality of second starting cells 138, each extending upwards from the vowel track 126 and towards the left by a second length $L_2$. In the present aspect, each of the second starting cells 138 can contain a consonant which cannot be "stretched" during pronunciation without adding a superfluous vowel sound. For example, the sound of the letter "d" cannot be extended without adding a superfluous vowel sound such as "uh." The consonants of the second starting cells 138 can correspond to plosive consonant sounds. In the present aspect, the second starting cells 138 can contain the consonants "b", "g", "d", "c", "t", and "p", for example and without limitation. The second starting cells 138 can also contain multiple letters, such as a digraph, corresponding to a plosive consonant sound, such as "st" for example and without limitation.

The consonants "b", "g", and "d" can each be voiced consonants, and the consonants "c", "t", "p" can be unvoiced consonants. In the present aspect, the voiced consonants can be placed within the second starting sub-block 132b proximate to the first starting sub-block 132a and before the unvoiced consonants. In other aspects, the unvoiced consonants can be placed within the second starting sub-block 132b before the voiced consonants. In other aspects, the voiced consonants and the unvoiced consonants can be intermixed within the second starting cells 138 of the second starting sub-block 132b and may not be separated.

In the present aspect, the first length $L_1$ of the first starting cells 136 can be greater than the second length $L_2$ of the second starting cells 138 in order to provide a visual indicator to the user 300 that the consonants of the first starting cells 136 can be extended during pronunciation while the consonants of the second starting cells 138 cannot be extended during pronunciation. In other aspects, the first length $L_1$ may not exceed the second length $L_2$. In the present aspect, the consonants of the first starting cells 136 can be depicted with a ghost trail effect to provide a visual indicator to the user 300 that the consonants of the first starting cells 136 can be extended during pronunciation. The ghost trail effect can be denoted by an increasingly faint outline for the consonants as the consonants extend away from the vowel track 126. In other aspects, the support indicia 114 can depict graphical reminders, such as above the respective starting sub-blocks 132a,b, to remind the user 300 that the consonants of the first starting cells 136 can be extended during pronunciation and that the consonants of the second starting cells 138 cannot be extended during pronunciation.

The ending block 124 can extend along a portion of the bottom track side 128 proximate to the right track side 130. The ending block 124 can comprise a first ending sub-block 134a and a second ending sub-block 134b. In the present aspects, the first ending sub-block 134a and the second ending sub-block 134b can each be shaped as a parallelogram; however in other aspects, either or both of the first ending sub-block 134a and the second ending sub-block 134b can define a different shape, such as rectangular, elliptical, polygonal, or any other suitable shape.

The first ending sub-block 134a can comprise a plurality of first ending cells 140, each extending downwards from the vowel track 126 and towards the right by a third length $L_3$. In the present aspect, the third length $L_3$ can be equal to the first length $L_1$; however, in other aspects, the third length $L_3$ can be longer or shorter than the first length $L_1$. In the present aspect, each of the first ending cells 140 can contain a consonant which can be extended or "stretched" during pronunciation. For example and without limitation, the first ending cells 140 can contain consonants corresponding to nasal, fricative, or affricate consonant sounds. The first ending cells 140 can contain the consonants "m", "n", "f", and "s", for example and without limitation. The consonants of the first ending cells 140 can overlap with some or all of the consonants of the first starting cells 136; however in some aspects, the consonants of the first ending cells 140 can be different from the consonants of the first starting cells 136. In some aspects, some or all of the first ending cells 140 can contain multiple letters corresponding to an extendable consonant sound, such as "th", "sh", or "ll" for example and without limitation.

The consonants "m" and "n" can each be voiced consonants, and the consonants "f" and "s" can be unvoiced consonants. In the present aspect, the unvoiced consonants can be placed within the first ending sub-block 134a proximate to the right track side 130 and after the voiced consonants. In other aspects, the unvoiced consonants can be placed within the first ending sub-block 134a before the voiced consonants. In other aspects, the voiced consonants and the unvoiced consonants can be intermixed within the first ending cells 140 of the first ending sub-block 134a and may not be separated.

The second ending sub-block 134b can comprise a plurality of second ending cells 142, each extending downwards from the vowel track 126 and towards the right by a fourth length $L_4$. In the present aspect, the fourth length $L_4$ can be equal to the second length $L_2$; however, in other aspects, the fourth length $L_4$ can be longer or shorter than the second length $L_2$. In the present aspect, each of the second ending cells 142 can contain a consonant which cannot be "stretched" during pronunciation without adding a superfluous vowel sound. The consonants of the second ending cells 142 can correspond to plosive consonant sounds. In the present aspect, the second ending cells 142 can contain the consonants "b", "g", "d", "x", "t", and "p", for example and without limitation. The second ending cells 142 can also contain multiple letters, such as a digraph, corresponding to a plosive consonant sound, such as "ck" or "st" for example and without limitation. The second ending cells 142 which contain multiple letters can each be a wide cell 144 sized to provide space to depict multiple letters side-by-side.

The consonants "b", "g", and "d" can each be voiced consonants, and the consonants "x", "t", and "p" can be unvoiced consonants. The digraph "ck" can also be pronounced as an unvoiced consonant sound and can be grouped with the unvoiced consonants. In the present aspect, the unvoiced consonants can be placed within the second ending sub-block 134b proximate to the first ending sub-block 134a and after the voiced consonants. In other aspects, the unvoiced consonants can be placed within the second ending sub-block 134b before the voiced consonants. In other aspects, the voiced consonants and the unvoiced consonants can be intermixed within the second ending cells 142 of the second ending sub-block 134b and may not be separated.

In the present aspect, the third length $L_3$ of the first ending cells 140 can be greater than the fourth length $L_4$ of the second ending cells 142 in order to provide a visual indicator to the user 300 that the consonants of the first ending cells 140 can be extended during pronunciation while the consonants of the second ending cells 142 cannot be extended during pronunciation. In other aspects, the third length $L_3$ may not exceed the fourth length $L_4$. In the present aspect, the consonants of the first ending cells 140 can be depicted with the ghost trail effect to provide a visual indicator to the user 300 that the consonants of the first ending cells 140 can be phonetically extended. In other aspects, the support indicia 114 can depict graphical reminders, such as below the respective ending sub-blocks 134a,b, to remind the user 300 that the consonants of the first ending cells 140 can be extended during pronunciation and that the consonants of the second ending cells 142 cannot be extended during pronunciation.

The cells 136,138,140,142, and the vowel track 126 can each define a diagonal, or "slanted," orientation. For example, the cells 136,138 can slant left-to-right as the cells 136,138 extend downwards towards the vowel track 126. Similarly, the cells 140,142 can slant left-to-right as the cells 140,142 extend downwards and away from the vowel track 126. In the present aspect, the diagonal orientation can be configured to lead the user in a left-to-right and top-to-bottom orientation typical of the English language. For example, the diagonal orientation of the starting cells 136, 138 can guide the eyes of the user 300 left-to-right and downwards towards the vowel track 126. The diagonal orientation of vowel track 126 and the ending cells 140,142 can guide the eyes of the user left-to-right and downwards, from the vowel track 126 to the ending cells 140,142.

In other aspects, the vowel track 126 can be vertically oriented. In such aspects, the starting block 122 can extend along the left track side 129 of the vowel track 126, and the ending block 124 can extend along the right track side 130 of the vowel track 126. In other aspects, some or all of the cells 136,138,140,142 can be blank, and consonants or other letters can be positioned in each cell by methods such as writing with a crayon, pen, pencil, marker, or chalk stick, attaching stickers, such as reusable vinyl stickers, or attached letter tokens to the respective cells 136,138,140, 142 with an attachment mechanism such as a magnet, hook-and-loop fastener, push pin, staple, or other suitable method. Such methods can allow the cells 136,138,140,142 to be adapted to other lessons or skill levels for multiple users 300 or to adapt to progress of an individual user 300. In other aspects, the second side surface 710 (shown in FIG. 7) can comprise the starting block 122, the vowel track 126, and the ending block 124; however, some or all of the cells 136,138,140,142 can be blank.

Figure 2:
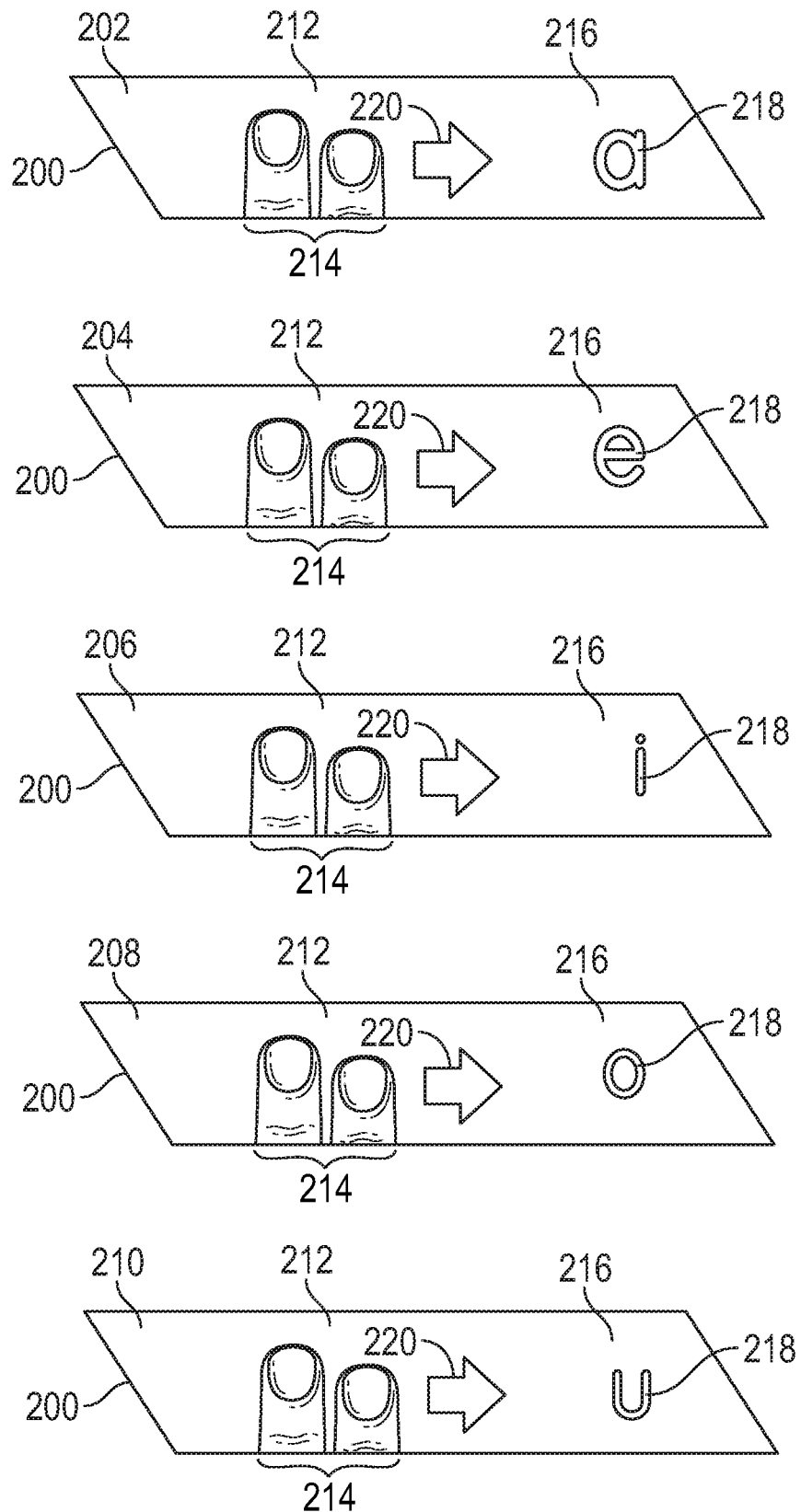
FIG. 2 is a top view of multiple aspects of a vowel card of the reading teaching aid assembly of FIG. 1.

FIG. 2 is a top view of multiple aspects of a vowel card 200 of the reading teaching aid assembly 100. Each vowel card 200 can define a handling portion 212 and a vowel portion 216. In the present aspect, a directional arrow 220 can be positioned between the handling portion 212 and the vowel portion 216. The directional arrow 220 can point in a reading direction of a language of the reading teaching aid assembly 100. For example and without limitation, in the present aspect, the language of the reading teaching aid assembly 100 can be English, and the reading direction of English can be left-to-right. Therefore, the directional arrow 220 can point left-to-right. In an aspect in which the reading direction of the language of the reading teaching aid assembly 100 is right-to-left, such as Arabic, the directional arrow 220 can point right-to-left. In such an aspect, the diagonal orientation of the starting block 122, the vowel track 126, the ending block 124, and the vowel card 200 can be mirrored right-to-left so that the starting block 122 can slant downwards and right-to-left towards the vowel track 126, and the ending block 124 can slope downwards and right-to-left away from the vowel track 126 (starting block 122, vowel track 126, and ending block 124 shown in FIG. 1). This mirrored diagonal orientation can be configured to lead the user in a right-to-left and top-to-bottom orientation of some languages, such as Arabic. In such an aspect, the starting block 122 can be positioned at the right track side 130 (shown in FIG. 1), and the ending block 124 can be positioned at the left track side 129 (shown in FIG. 1).

The handling portion 212 can define handling indicia 214. In the present aspect, the handling indicia 214 can be a graphic depicting at least one finger. The handling indicia 214 can indicate that the user 300 can position at least one finger 310 (shown in FIG. 3A) on the handling indicia 214 to control the vowel card 200.

The vowel portion 216 of each vowel card 200 can define a vowel 218. The vowel 218 of a first aspect of the vowel card 200 can be an "a", and the vowel card 200 can be an a-card 202. The vowel 218 of a second aspect of the vowel card 200 can be an "e", and the vowel card 200 can be an e-card 204. The vowel 218 of a third aspect of the vowel card 200 can define an "i", and the vowel card 200 can be an i-card 206. The vowel 218 of a fourth aspect of the vowel card 200 can define an "o", and the vowel card 200 can be an o-card 208. The vowel 218 of a fifth aspect of the vowel card 200 can define a "u", and the vowel card 200 can be an u-card 210. In some aspects, the vowel 218 of a sixth aspect of the vowel card 200 can define a "y", and the vowel card 200 can be a y-card (not shown). In other aspects, the vowel portion 216 can define multiple vowels, such as the digraphs "ie", "ou", "ai", or any other suitable combination. In some aspects, the vowel portion 216 can define other letters, such as consonants. In some aspects, an aspect of the vowel card 200 can define a blank space (not shown) in place of the vowel 218. The blank space can allow a teacher (not shown) or the user 300 (shown in FIG. 3A) to record or otherwise select a chosen vowel to be placed in the blank space. The chosen vowel can be defined in the blank space through a method such as writing the chosen vowel with a dry erase marker, grease pencil, crayon, pencil, or other writing utensil, applying a sticker, such as a vinyl sticker, to the blank space, attaching a card defining the chosen vowel over the blank space, such as with a hook-and-loop fastener, or any other suitable method.

Figure 3A:
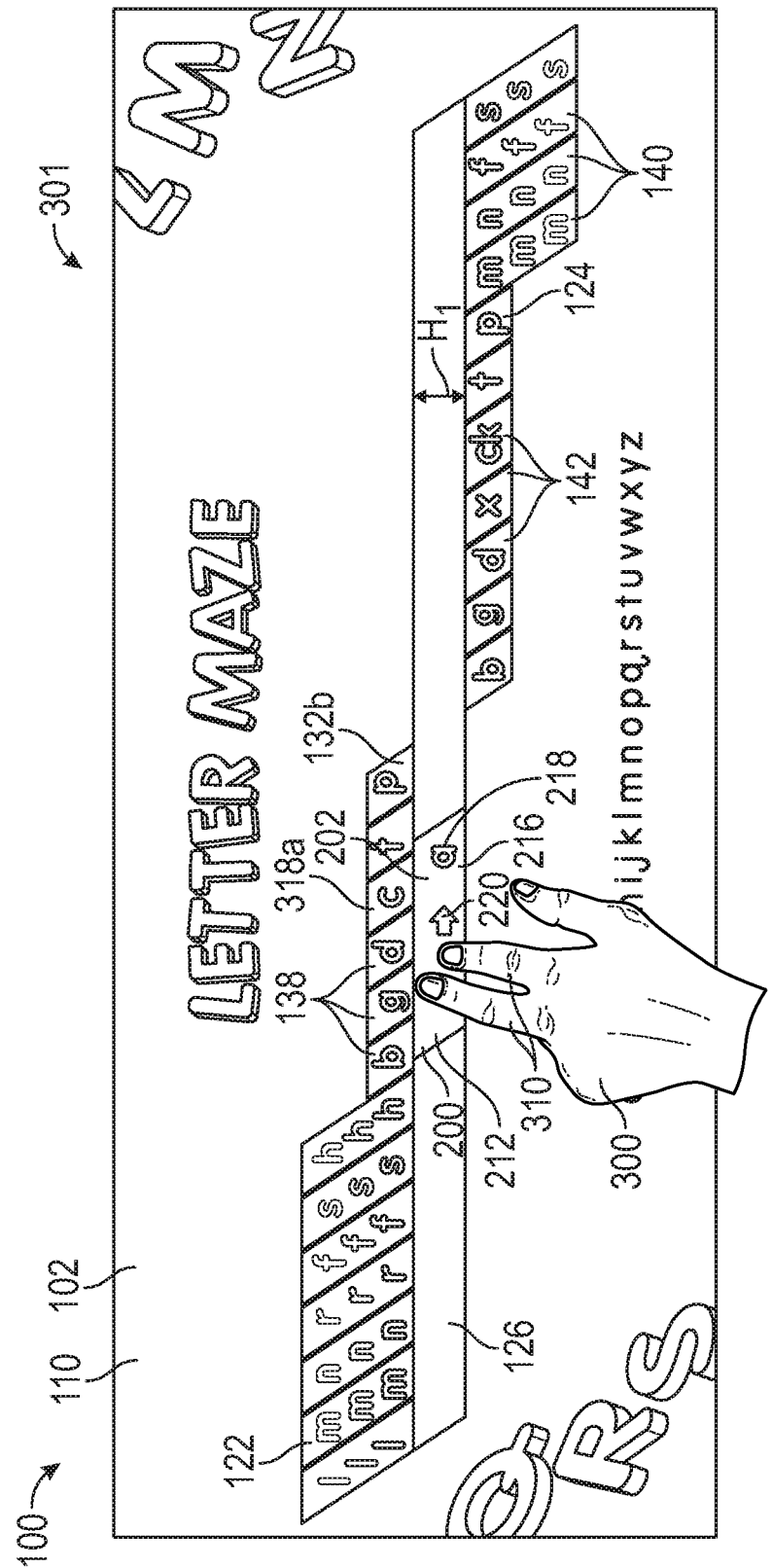
FIG. 3A is a top view of a step of a method for using the reading teaching aid assembly in accordance with one aspect of the present disclosure.

FIGS. 3A-6B can demonstrate methods of using the reading teaching aid assembly 100. FIG. 3A is a top view of a step 301 of a method for using the reading teaching aid assembly 100. The user 300 can place at least one finger 310 on the handling portion 212 of the vowel card 200, and the user 300 can position the vowel card 200 along the vowel track 126. In the present aspect, the vowel card 200 can be the "a"-card 202; however, any vowel card 200 can be used with any method disclosed. In the present aspect, the vowel cards 200 can be sized complimentary to the height H₁ of the vowel track 126. In some aspects, the vowel track 126 can be recessed, and the vowel card 200 can fit within the vowel track 126.

The user 300 can align the vowel 218 with a selected one of the second starting cells 138 of the second starting sub-block 132b. A starting consonant 318a of the selected one of the second starting cells 138 can define a plosive consonant sound which cannot be extended during pronunciation without adding a superfluous vowel. Once aligned, the user 300 can then pronounce the starting consonant 318a of the selected one of the second starting cells 138 together with the vowel 218 of the vowel card 200. In the present aspect, the vowel cards 200 can be shaped as parallelograms defining the diagonal orientation, and the diagonal orientation of the second starting cells 138 and the vowel card 200 can lead the eyes of the user 300 from the second starting cell to the vowel 218 of the vowel card 200.

In the aspect shown, the starting consonant 318a can be a "c", and the vowel 218 can be an "a". The user 300 can pronounce the "CA" sound as a single sound. By pairing the starting consonant 318a with the vowel 218, the user 300 can pronounce "CA" together as a single sound without adding a superfluous vowel, such as "Cuh-A". Pronouncing the starting consonant 318a and the vowel 218 together can prevent mispronunciation and incorrect phonetic associations with the starting consonant 318a.

Figure 3B:
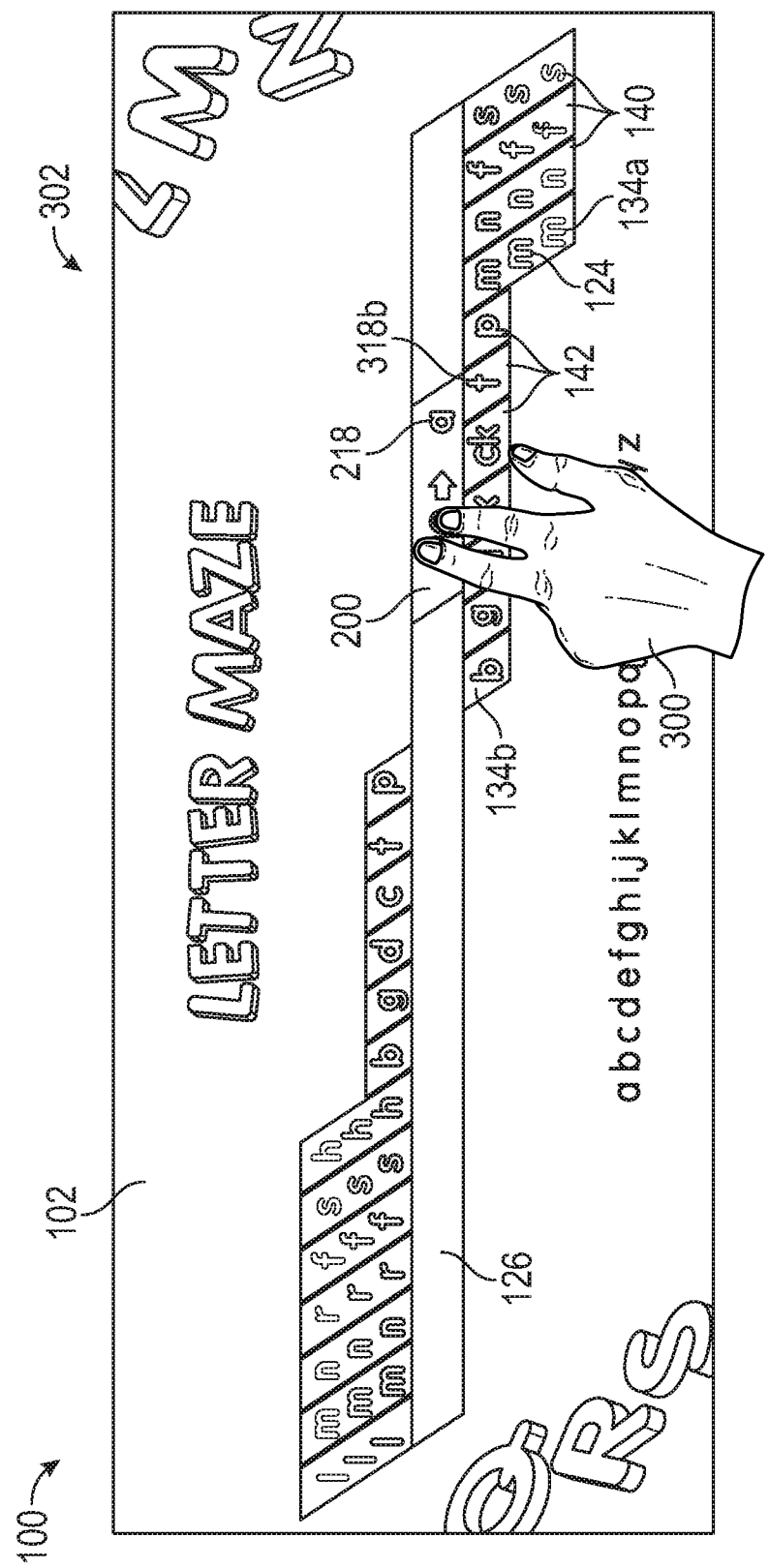
FIG. 3B is a top view of a second step of the method for using the reading teaching aid assembly of FIG. 3A.

The user 300 can then slide the vowel card 200 along the vowel track 126 in the reading direction of the directional arrow 220 to align the vowel 218 with a cell 140,142 of the ending block 124, as shown in a step 302 of FIG. 3B. FIG. 3B is a top view of the step 302 of the method for using the reading teaching aid assembly 100. In the present aspect, the vowel 218 can be aligned with a selected one of the second ending cells 142, and an ending consonant 318b of the selected one of the second ending cells 142 can define a plosive consonant sound. In the present aspect, the ending consonant 318b is a "t", and the user 300 can pronounce the "T" sound out loud. In practice, step 302 can immediately follow step 301 so that the user 300 can pronounce "CAT" as a single word. Pronunciation of the starting consonant 318a and the vowel 218 together, followed by pronunciation of the ending consonant 318b can prevent the user 300 from pronouncing "Cuh-AT" by pairing the plosive consonant sound of the starting consonant 318a with the vowel 218. Because vowel sounds can always be extended, in other aspects, steps 301 and 302 can be separated by a pause in time to allow individual practice of the pronunciation of the starting consonant 318a and the vowel 218 together as one sound, and the ending consonant 318b separately. The extended shape of the vowel track 126 can provide a visual indicator to the user 300 that the vowels 218 of the vowel cards 200 can be extended.

Figure 4A:
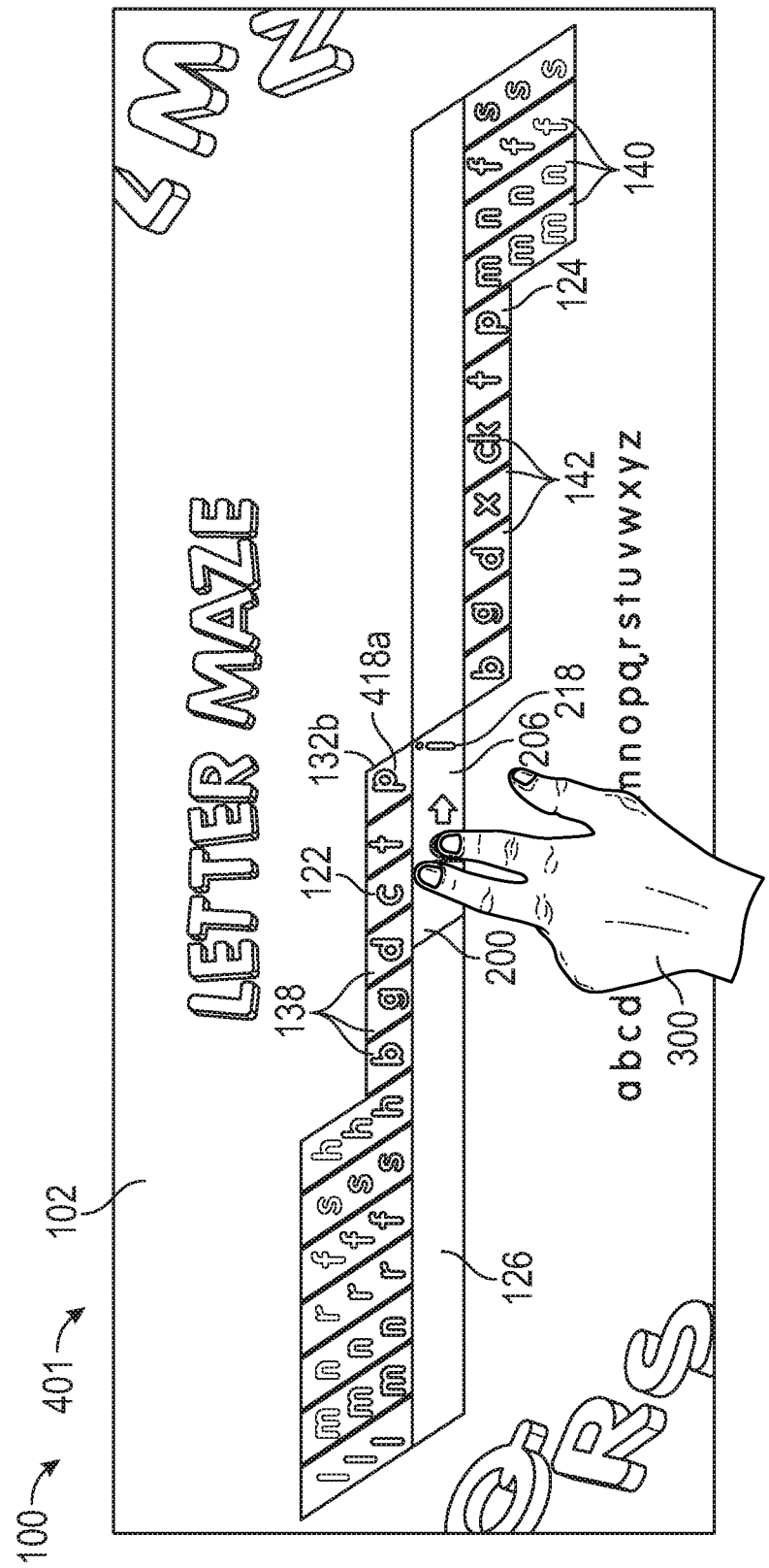
FIG. 4A is a top view of a step of a method for using the reading teaching aid assembly in accordance with another aspect of the present disclosure.

FIG. 4A is a top view of a step 401 of a method for using the reading teaching aid assembly 100. The user 300 can align the vowel 218 of the vowel card 200 with a selected one of the second starting cells 138 of the second starting sub-block 132b. The user 300 can then pronounce a starting consonant 418a of the selected one of the second starting cells 138 together with the vowel 218 of the vowel card 200. The starting consonant 418a of the selected one of the second starting cells 138 can define a plosive consonant sound. In the present aspect, the vowel card 200 can be the i-card 206, and the vowel 218 can be an "i". In the aspect shown, the starting consonant 418a can be a "p". The user 300 can pair the plosive consonant sound of the starting consonant 418a with the vowel 218 to pronounce the "PI" sound as a single sound, without adding a superfluous vowel sound such as "Puh-I".

Figure 4B:
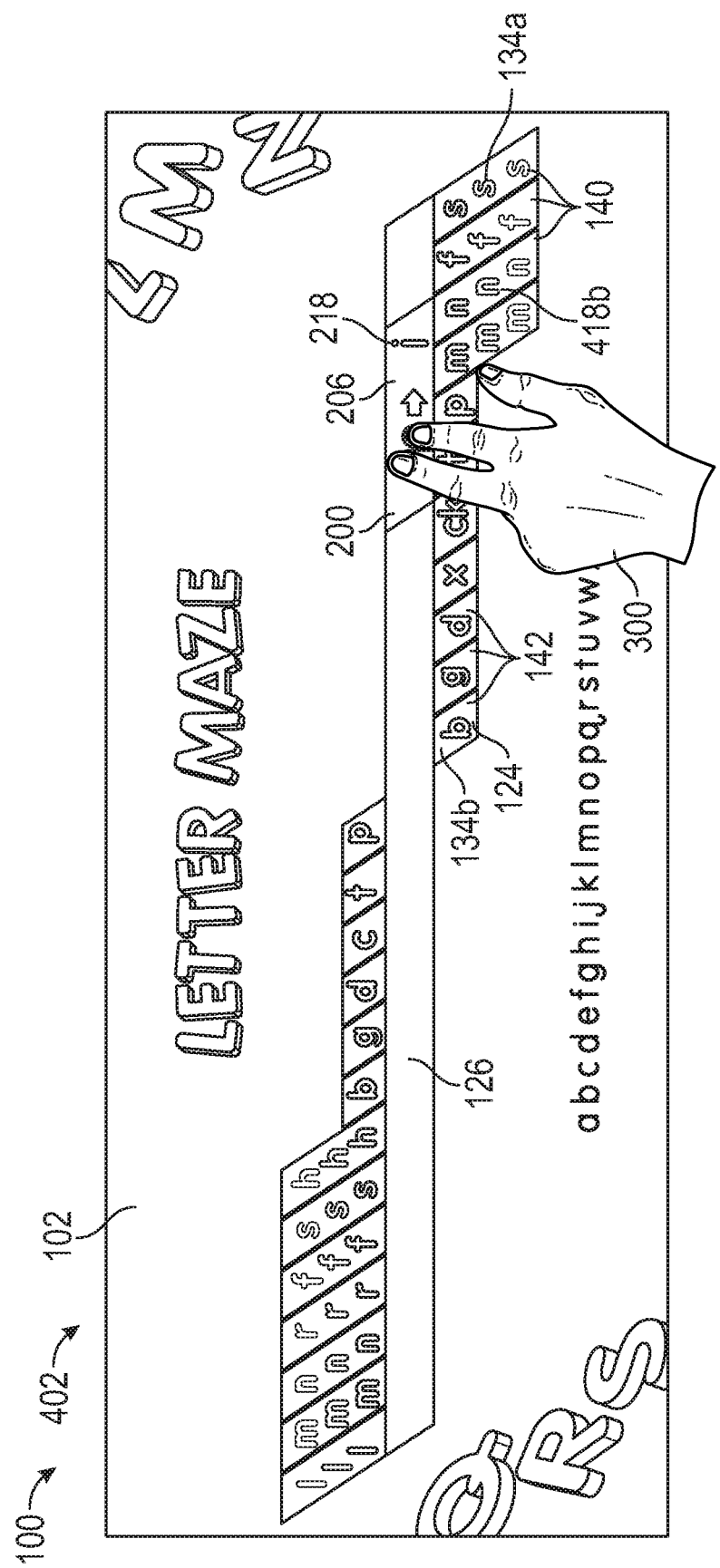
FIG. 4B is a top view of a second step of the method for using the reading teaching aid assembly of FIG. 4A.

The user 300 can then slide the vowel card 200 along the vowel track 126 to align the vowel 218 with a cell 140,142 of the ending block 124, as shown in a step 402 of FIG. 4B. FIG. 4B is a top view of the step 402 of the method for using the reading teaching aid assembly 100. In the present aspect, the vowel 218 can be aligned with a selected one of the first ending cells 140, and an ending consonant 418b of the selected one of the first ending cells 140. In the present aspect, the ending consonant is an "n" which can define an extendable nasal consonant sound. The user 300 can pronounce the "N" sound out loud. Because the first ending cells 140 contain extendable or "stretchable" consonants, the user 300 can either succinctly pronounce the ending consonant 418b as "N" or can extend the pronunciation as "Nnn". In practice, step 402 can immediately follow step 301 so that the user 300 can pronounce "PIN" as a single word, or "PINnn" with an extended pronunciation of the ending consonant 418b. In other aspects, steps 401 and 402 can be separated by a pause in time to allow individual practice of the pronunciation of the starting consonant 418a and the vowel 218 together as one sound, and the ending consonant 418b separately.

Figure 5A:
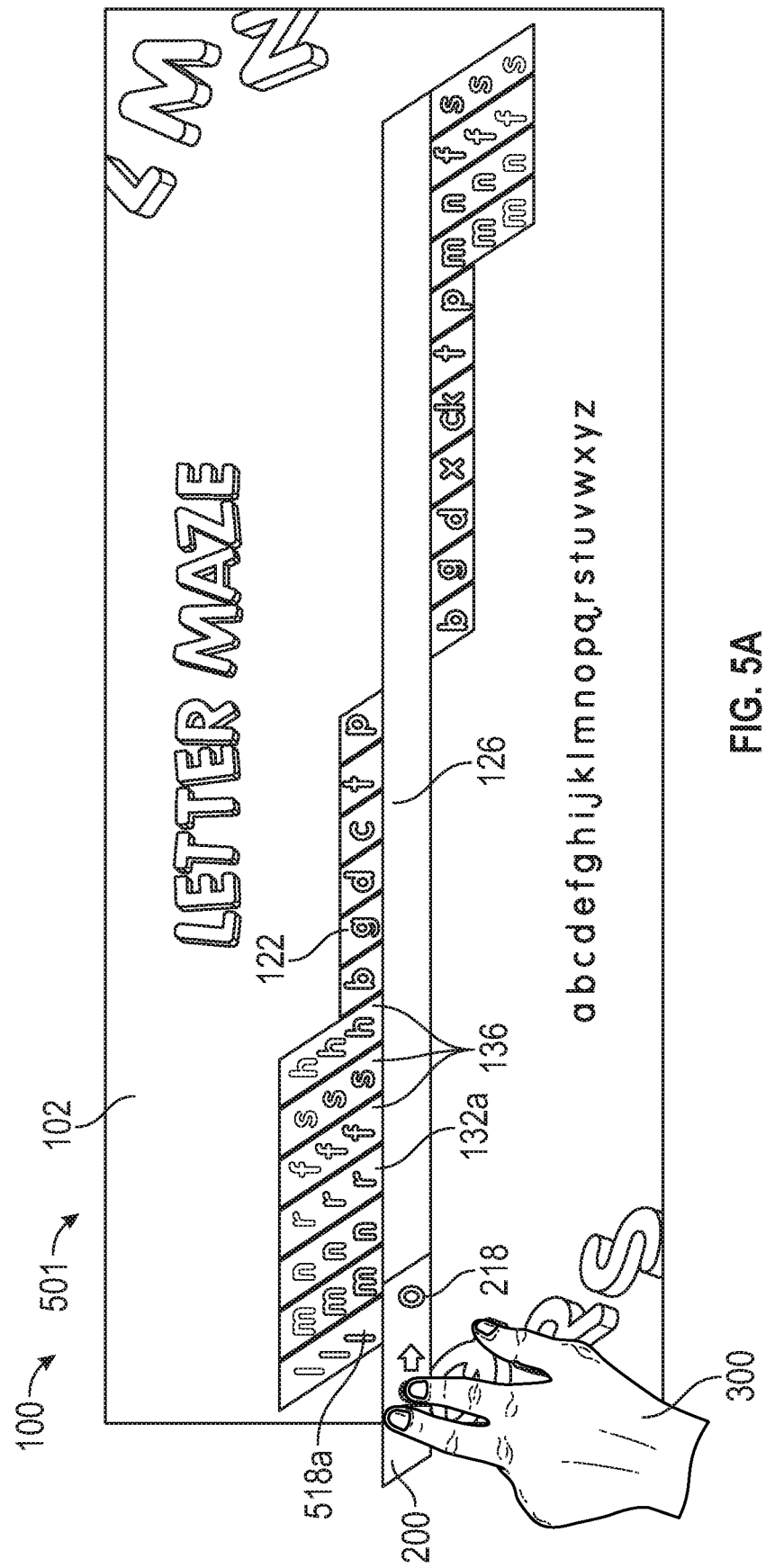
FIG. 5A is a top view of a step of a method for using the reading teaching aid assembly in accordance with another aspect of the present disclosure.

FIG. 5A is a top view of a step 501 of a method for using the reading teaching aid assembly 100. The user 300 can align the vowel 218 of the vowel card 200 with a selected one of the first starting cells 136 of the first starting sub-block 132a. The user 300 can then pronounce a starting consonant 518a of the selected one of the first starting cells 136 together with the vowel 218 of the vowel card 200. The starting consonant 518a of the selected one of the first starting cells 136 can be an "l" which can define an extendable consonant sound. Because, the starting consonant 518a defines an extendable sound, the user 300 can succinctly pronounce the "l" as "L" or can extend the pronunciation as "Lll", for example to practice pronunciation of the sound. In the present aspect, the vowel card 200 can be the o-card 208, and the vowel 218 can be an "o". The user 300 can pair the extendable consonant sound of the starting consonant 518a with the vowel 218 to succinctly pronounce the "LO" sound as a single sound or extend the pronunciation as "LllO" or "LllOoo," such as by extending the vowel 218 sound as well.

Figure 5B:
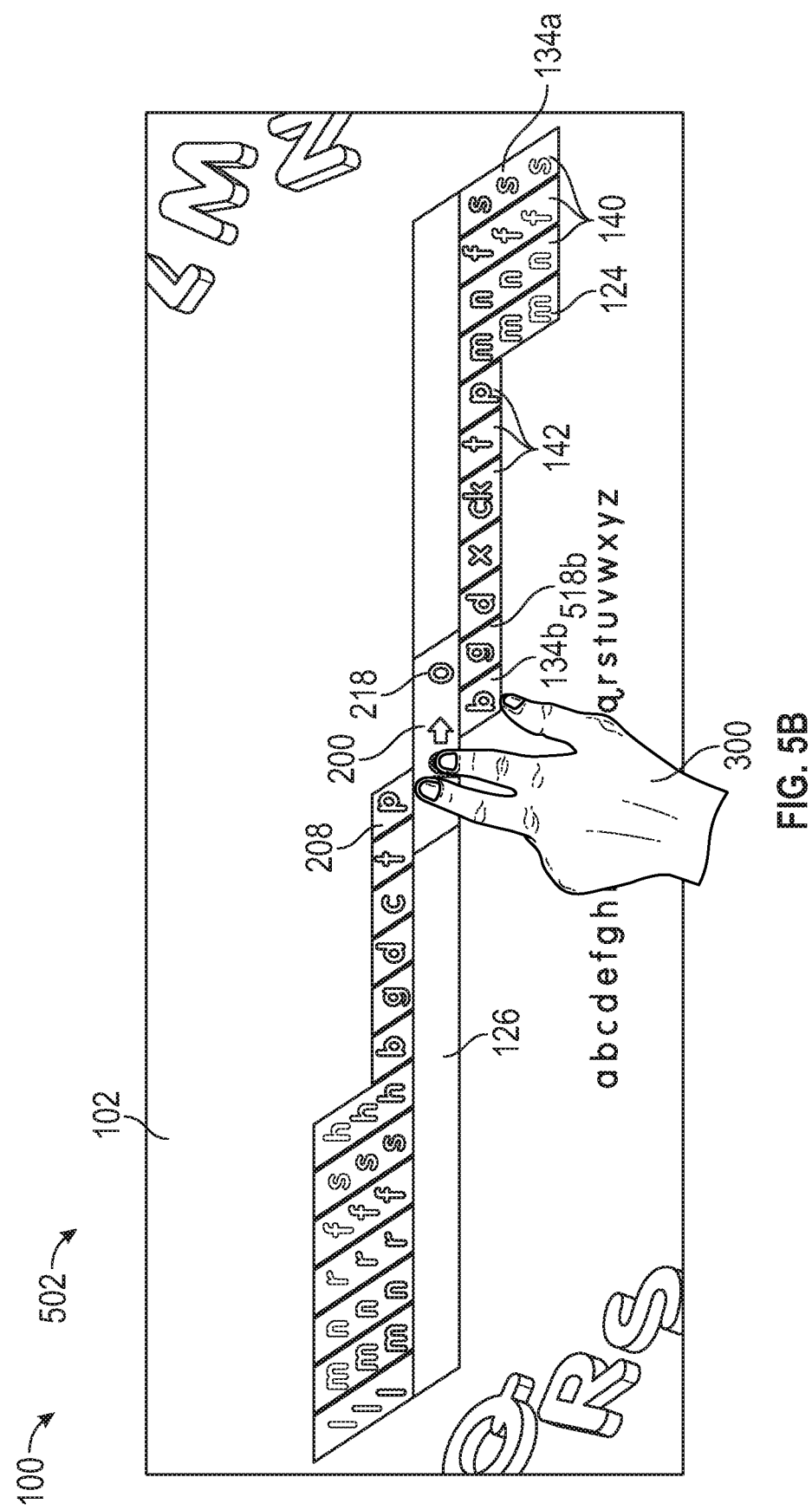
FIG. 5B is a top view of a second step of the method for using the reading teaching aid assembly of FIG. 5A.

The user 300 can then slide the vowel card 200 along the vowel track 126 to align the vowel 218 with a cell 140,142 of the ending block 124, as shown in a step 502 of FIG. 5B. FIG. 5B is a top view of the step 502 of the method for using the reading teaching aid assembly 100. In the present aspect, the vowel 218 can be aligned with a selected one of the second ending cells 142, and an ending consonant 418b of the selected one of the second ending cells 142. In the present aspect, the ending consonant 418b can be a "g" which can define a plosive consonant sound which cannot be extended during pronunciation without adding a superfluous vowel sound. The user 300 can pronounce the "G" sound out loud. In practice, step 502 can immediately follow step 501 so that the user 300 can pronounce "LOG" as a single word, or "LllOG" with an extended pronunciation of the starting consonant 418a. In other aspects, steps 501 and 502 can be separated by a pause in time to allow individual practice of the pronunciation of the starting consonant 518a, the vowel 218, and the ending consonant 518b.

Figure 6A:
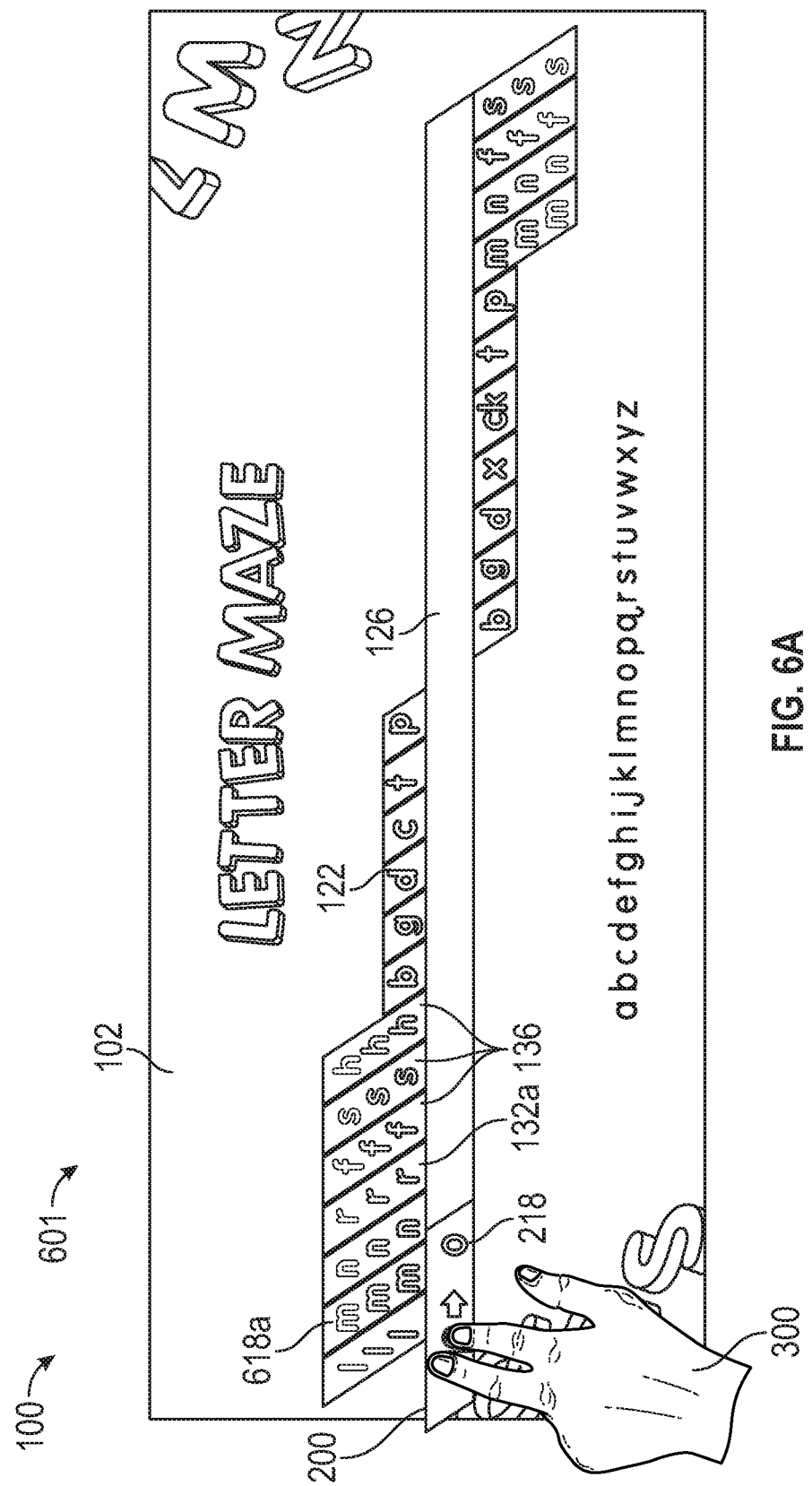
FIG. 6A is a top view of a step of a method for using the reading teaching aid assembly in accordance with another aspect of the present disclosure.

FIG. 6A is a top view of a step 601 of a method for using the reading teaching aid assembly 100. The user 300 can align the vowel 218 of the vowel card 200 with a selected one of the first starting cells 136 of the first starting sub-block 132a. The user 300 can then pronounce a starting consonant 618a of the selected one of the first starting cells 136 together with the vowel 218 of the vowel card 200. In the present aspect, the starting consonant 618a of the selected one of the first starting cells 136 can be an "m" which can define an extendable consonant sound. Because, the starting consonant 518a defines an extendable consonant sound, the user 300 can succinctly pronounce the "m" as "M" or can extend the pronunciation as "Mmm", for example to practice pronunciation of the sound. In the present aspect, the vowel card 200 can be the o-card 208, and the vowel 218 can be an "o". The user 300 can pair the extendable consonant sound of the starting consonant 618a with the vowel 218 to succinctly pronounce the "MO" sound as a single sound or to extend the pronunciation as "MmmO" or "MmmOooo," such as by extending the vowel 218 sound as well.

Figure 6B:
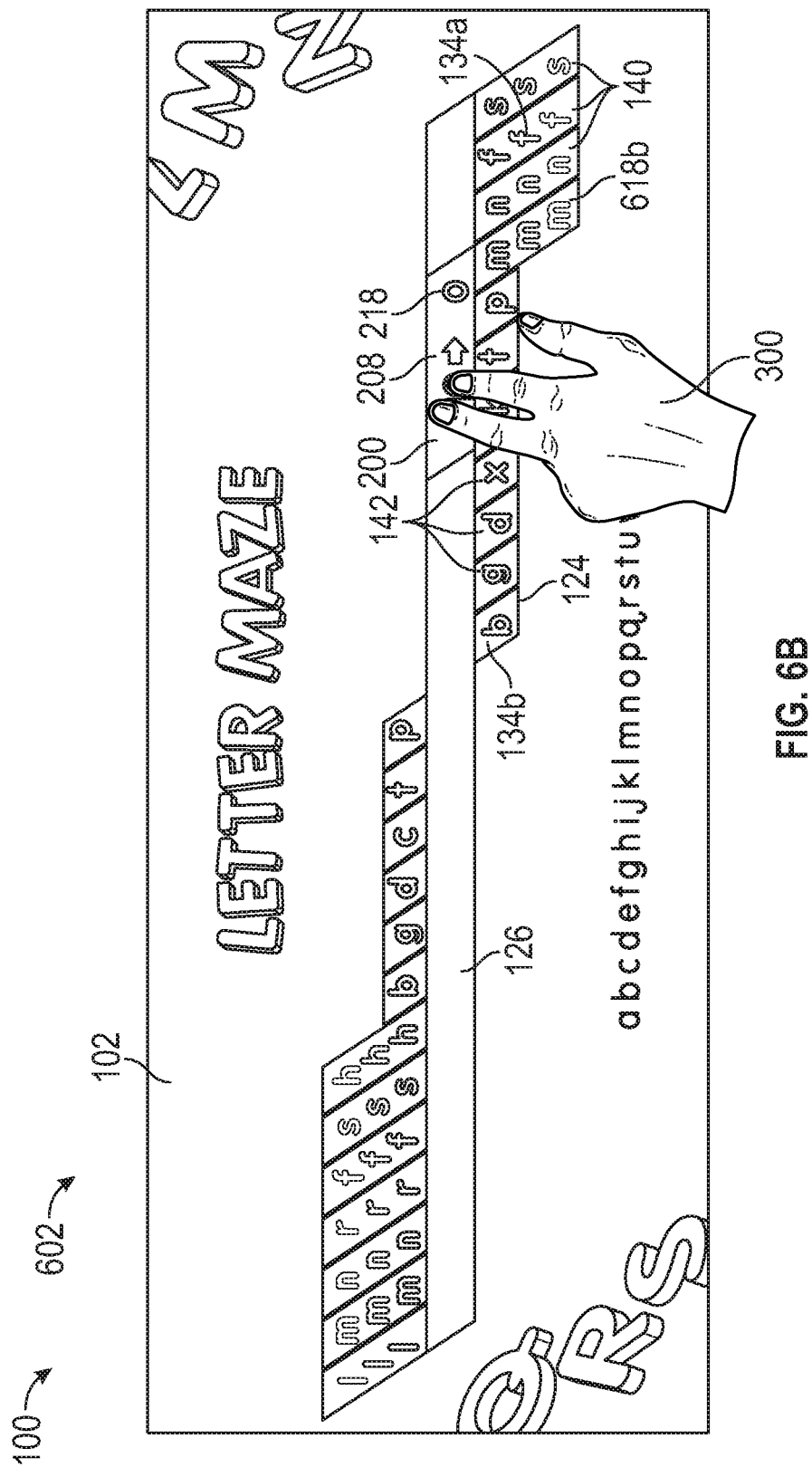
FIG. 6B is a top view of a second step of the method for using the reading teaching aid assembly of FIG. 6A.

The user 300 can then slide the vowel card 200 along the vowel track 126 to align the vowel 218 with a cell 140,142 of the ending block 124, as shown in a step 602 of FIG. 6B. FIG. 6B is a top view of the step 602 of the method for using the reading teaching aid assembly 100. In the present aspect, the vowel 218 can be aligned with a selected one of the first ending cells 140, and an ending consonant 618b of the selected one of the first ending cells 140. In the present aspect, the ending consonant is an "m" which can define an extendable consonant sound. The user 300 can pronounce the "M" sound out loud. Because the first ending cells 140 contain consonants defining extendable or "stretchable" consonant sounds, the user 300 can either succinctly pronounce the ending consonant 618b as "M" or can extend the pronunciation as "Mmm", for example to practice pronunciation of the ending consonant 618b. In practice, step 602 can immediately follow step 601 so that the user 300 can pronounce "MOM" as a single word, "MmmOMmm" with an extended pronunciation of the starting and ending consonants 618a,b, "MmmOM" with a an extended pronunciation of the starting consonant 618a, or "MOMmm" with an extended pronunciation of the ending consonant 618b. In other aspects, steps 601 and 602 can be separated by a pause in time to allow individual practice of the pronunciation of the starting consonant 618a, the vowel 218, and the ending consonant 618b.

Figure 7:
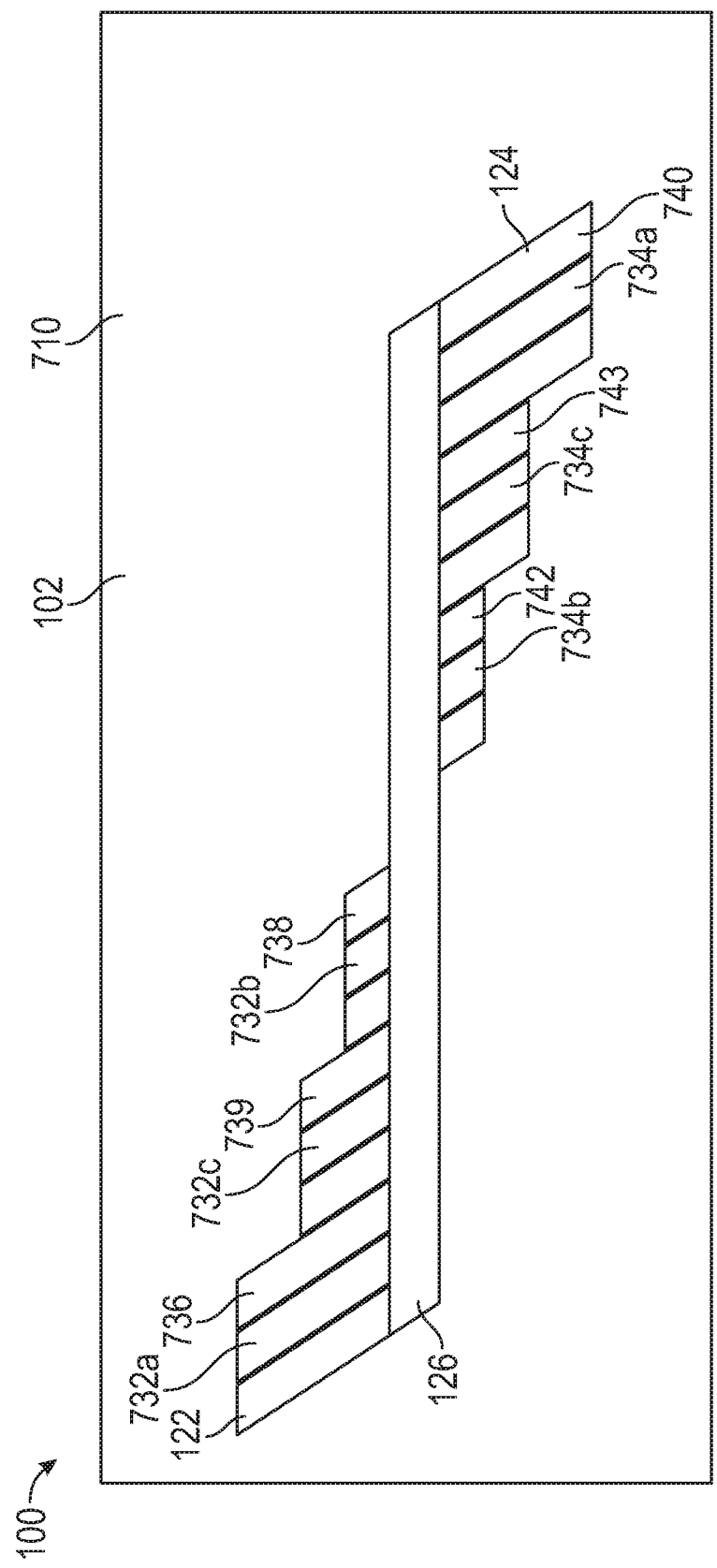
FIG. 7 is a top view of a second side surface of the board of the reading teaching aid assembly of FIG. 1 in accordance with another aspect of the current disclosure.

FIG. 7 is a top view of the second side surface 710 of the board 102 of the reading teaching aid assembly 100 of FIG. 1. In the present aspect, the second side surface 710 can also show the starting block 122 and the ending block 124, which can each be blank, and the user 300 can record consonants within the blocks 122,124, such as with a dry-erase marker or grease pencil. The starting block 122 can comprise three starting sub-blocks 732a,b,c. The first starting sub-block 732a can be substantially similar to the first starting sub-block 132a (shown in FIG. 1), and the second starting sub-block 732b can be substantially similar to the second starting sub-block 132b (FIG. 1). The first starting sub-block 732a can comprise first starting cells 736 configured to define consonants or digraphs associated with extendable or stretchable consonant sounds. The second starting sub-block 732b can comprise second starting cells 738 configured to define consonants or digraphs associated with unstretchable consonant sounds. The third starting sub-block 732c can be positioned between the first starting sub-block 732a and the second starting sub-block 732b, and the third starting sub-block 732c can be taller than the second starting sub-block 732b but shorter than the first starting sub-block 732a.

The third starting sub-block 732c can comprise third starting cells 739 configured to define digraphs which comprise consonants associated with both stretchable and unstretchable consonant sounds. For example and without limitation, the digraph "BR" comprises the unstretchable consonant sound of the "B" and the stretchable consonant sound of the "R". As another example, without limitation, the digraph "CL" comprises the unstretchable consonant sound of the "C" and the stretchable consonant sound of the "L". Other sounds which do not fit neatly in the stretchable or unstretchable groupings, for example and without limitation the letter "J", can be recorded within the third starting cells 739. The position and height of the third starting sub-block 732c can indicate that sounds of the third starting cells 739 are between the stretchable sounds of the first starting cells 736 and the second starting cells 738.

The ending block 124 can comprise three ending sub-blocks 734a,b,c. The first ending sub-block 734a can be substantially similar to the first ending sub-block 134a (shown in FIG. 1), and the second ending sub-block 734b can be substantially similar to the second ending sub-block 134b (FIG. 1). The first ending sub-block 734a can comprise first ending cells 740 configured to define consonants or digraphs associated with extendable or stretchable consonant sounds. The second ending sub-block 734b can comprise second ending cells 742 configured to define consonants or digraphs associated with unstretchable consonant sounds. The third ending sub-block 734c can be positioned between the first ending sub-block 734a and the second ending sub-block 734b, and the third ending sub-block 734c can be taller than the second ending sub-block 734b but shorter than the first ending sub-block 734a.

The third ending sub-block 734c can comprise third ending cells 743 configured to define digraphs which contain consonants associated with both stretchable and unstretchable consonant sounds. For example and without limitation, the digraph "BR" comprises the unstretchable consonant sound of the "B" and the stretchable consonant sound of the "R". As another example, without limitation, the digraph "CL" comprises the unstretchable consonant sound of the "C" and the stretchable consonant sound of the "L". Other sounds which do not fit neatly in the stretchable or unstretchable groupings, for example and without limitation the letter "J", can be recorded within the third starting cells 739. The position and height of the third ending sub-block 734c can indicate that sounds of the third ending cells 743 are between the stretchable sounds of the first ending cells 740 and the second ending cells 742. In the present aspect, each of the cells 736,738,739,740,742,743 can be wide cells 144 (shown in FIG. 1) to provide sufficient room for hand writing multiple letters.

Figure 8:
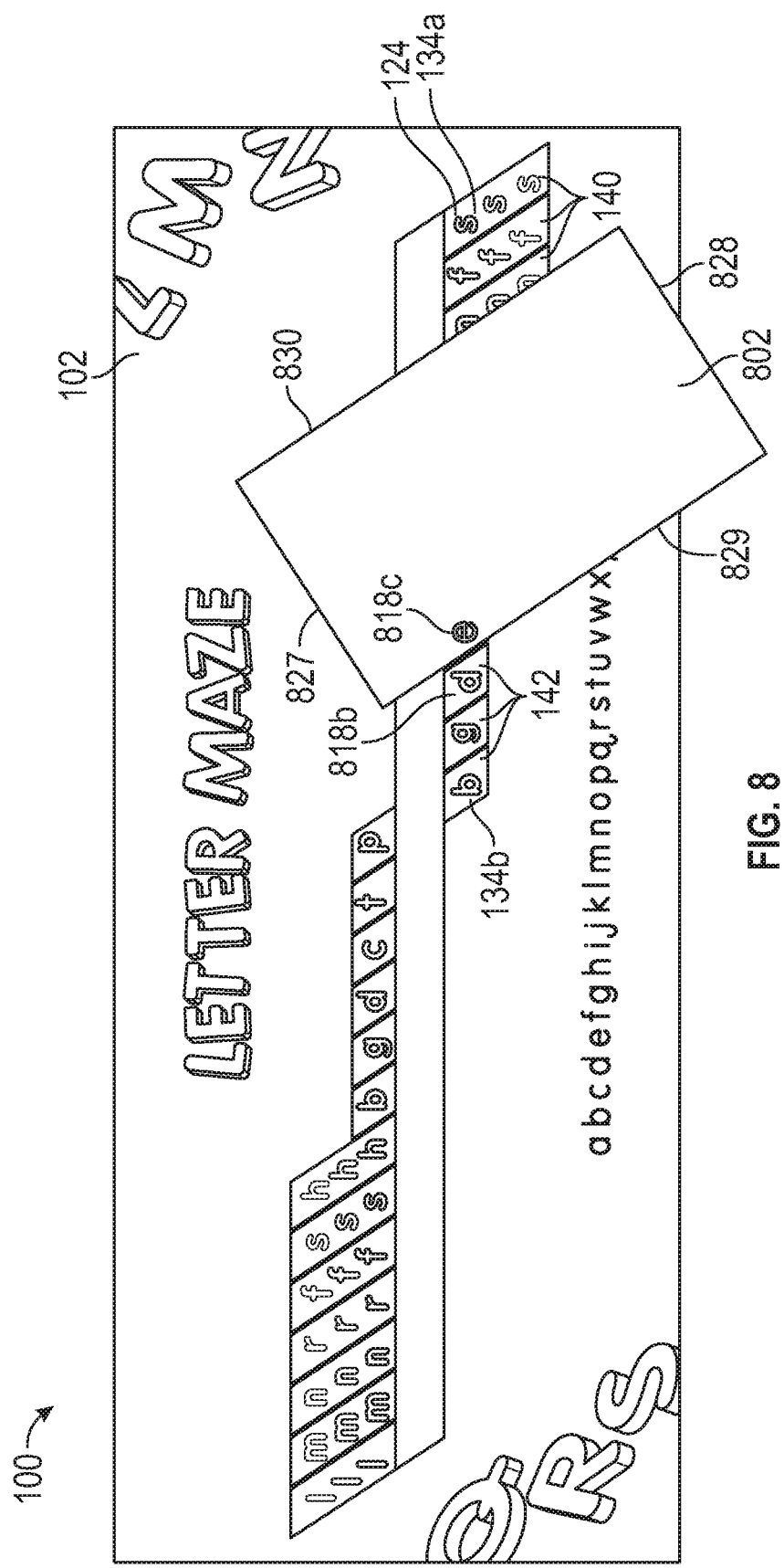
FIG. 8 is a detail view of an ending block of the reading teaching aid assembly of FIG. 1 further comprising a card in accordance with another aspect of the present disclosure.

FIG. 8 is a detail view of the ending block 124 of the of the board 102 of the reading teaching aid assembly 100 of FIG. 1, further comprising a card 802 in accordance with another aspect of the present disclosure. In the present aspect, the card 802 can be a notecard which can be permanently written on with writing utensils such as markers or pens or erasably written on with writing utensils such as a pencil. In other aspects, the card 802 can be configured to be erasably written upon with dry erase markers, grease pencils, crayons, or other erasable writing utensils. In such aspects, the card 802 can be laminated or can comprise a material such as a polymer, ceramic, metal, or any other material suitable for use with dry erase markers or other erasable writing utensils.

The card 802 can define a left edge 829, a right edge 830, a top edge 827, and a bottom edge 828. One of the edges 827,828,829,830 of the card 802 can be aligned to the right of an ending consonant 818b of a one of the ending cells 140,142 to cover an adjacent one of the ending cells 140, 142. For example and without limitation, the ending consonant 818b of the present aspect can be a "d", and the card 802 can cover the adjacent consonant "x". In some aspects, the card 802 can be blank. In the present aspect, the left edge 829 can define an ending vowel 818c, and the remaining edges 827,828,830 can be blank. In the present aspect, the ending vowel 818c can be an "e"; however, in other aspects, the ending vowel 818c can be a different vowel. In other aspects, multiple different ending vowels 818c can be written down the left edge 829. In still other aspects, some or all of the edges 827, 828, 829, 830 can define ending vowels 818c which can be different from one another. In other aspects, one side of the card 802 can define vowels 818c, consonants, or both, and a second side of the card 802 can be blank.

In one method for using the card 802, a blank edge, such as the right edge 830 of the card 802, can be aligned to the right of the ending consonant 818b to prevent the user 300 (shown in FIG. 3) from accidentally pronouncing the adjacent consonant after the ending consonant 818b. For example, in the present aspect, the card 802 can prevent the user 300 from pronouncing the adjacent consonant "x" after the ending consonant "d". In other aspects, the card 802 can also be aligned to the right of the starting consonants, such as starting consonants 318a,418a,518a,618a, to cover cells adjacent to the selected starting consonant.

In another method for using the card 802, the ending vowel 818c can be aligned after the ending consonant 818b, and the user 300 can pronounce the ending vowel 818c after the ending consonant 818b. For example and without limitation, if the starting consonant, such as starting consonants 318a,418a,518a,618a, is an "s", the vowel 218 (shown in FIG. 6A) is an "o", the ending consonant 818b is an "f", and the ending vowel 818c is an "a", the user 300 can pronounce the word "sofa". In the aspect shown, the ending vowel 818c can be silent but can affect the pronunciation of the starting consonant, the vowel 218, and the ending consonant 818b. For example and without limitation, if the starting consonant is an "m", the vowel 218 is an "a", the ending consonant 818b is a "d", and the ending vowel 818c is an "e", the "a" can be pronounced as a long vowel sound, and the user 300 can pronounce the word "made". Without the ending vowel 818c, the "a" can be pronounced as a short vowel, and the user 300 can pronounce the word "mad". With the ending vowel 818c defined as a silent "e", the user 300 can practice long and short vowel sounds of the vowel 218.

Figure 9:
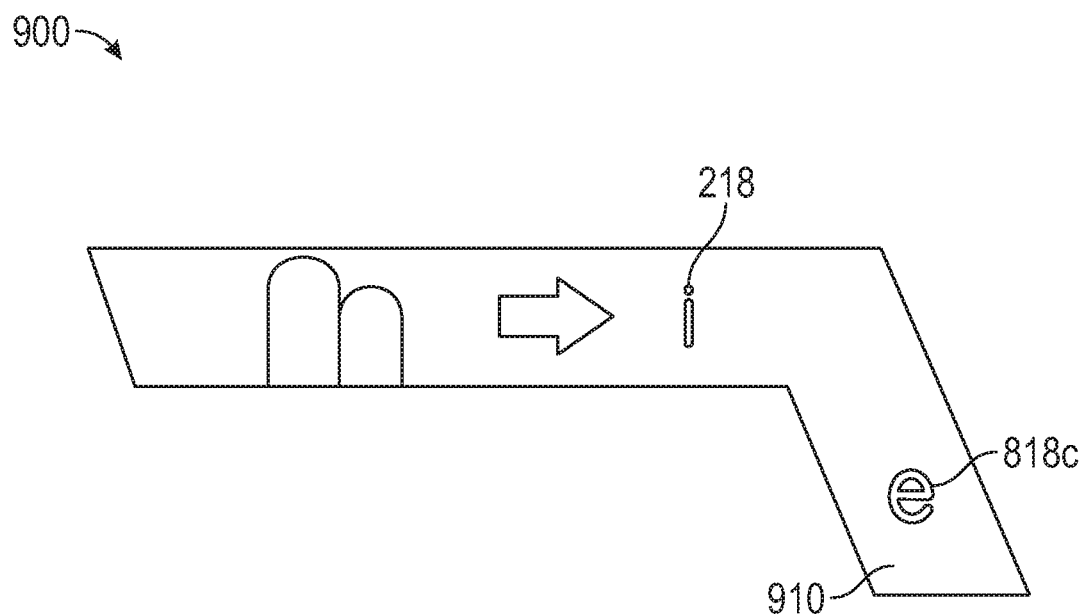
FIG. 9 is a top view of another aspect of a vowel card in accordance with another aspect of the present disclosure.

FIG. 9 is a top view of another aspect of a vowel card 900 in accordance with another aspect of the present disclosure. The vowel card 900 can comprise a wing 910 which can extend downwards from the vowel card 900 to cover cells 140, 142 which are adjacent to the ending consonants, such as ending consonants 318b,418b,518b,618b,818b. In other aspects, the vowel card 900 can define wings 910 which can extend either upwards, downwards, or both upwards and downwards from the vowel card 900 to block cells 136, 138, 140, 142 which are adjacent to the starting consonants, such as starting consonant 318a,418a,518a,618a, and the ending consonants.

In the present aspect, the wing 910 can define the ending vowel 818c to be pronounced after the ending consonant. In other aspects, the wings 910 can define additional vowels or consonants to be pronounced before or after the starting consonants or ending consonants. In some aspects, the wings 910 of the vowel card 900 can be configured to be erasably written upon with writing utensils such as dry erase markers, grease pencils, crayons, or other erasable writing utensils so that the user 300 can temporarily label the wing 910 with vowels or consonants to practice pronunciation in association with the starting consonants and ending consonants.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A reading teaching aid assembly comprising:
    a board, the board comprising:
        a vowel track,
        a starting block extending along the vowel track, the starting block comprising a plurality of starting cells, and
        an ending block extending along the vowel track, the ending block comprising a plurality of ending cells; and
    a vowel card aligned with the vowel track, a vowel of the vowel card being configured to align with a first starting cell of the plurality of starting cells, the first starting cell defining a starting consonant, the vowel card being configured to slide along the vowel track away from the starting block and towards the ending block, the starting block and the ending block positioned at opposite ends of the vowel track, the vowel being configured to align with a first ending cell of the plurality of ending cells, the first ending cell defining an ending consonant.

2. The reading teaching aid assembly of claim 1, wherein the ending consonant is configured to be pronounced immediately following pronouncing the starting consonant and the vowel together.

3. The reading teaching aid assembly of claim 1, wherein the starting consonant defines an extendable consonant sound.

4. The reading teaching aid assembly of claim 1, wherein the ending consonant defines an extendable consonant sound.

5. The reading teaching aid assembly of claim 1, wherein a card is aligned adjacent to the first ending cell to cover a second ending cell of the plurality of ending cells, the second ending cell positioned adjacent to the first ending cell.

6. The reading teaching aid assembly of claim 5, wherein an ending vowel is configured to be pronounced after pronouncing the ending consonant, the ending vowel defined on the card, the ending vowel positioned adjacent to the first ending cell.

7. The reading teaching aid assembly of claim 1, wherein a wing is aligned adjacent to the first ending cell when the vowel card is aligned with the first ending cell, wherein the wing is attached to the vowel card, and wherein the wing is positioned to the right of the first ending cell.

8. The reading teaching aid assembly of claim 1, wherein the vowel card is configured to slide along the vowel track away from the starting block and towards the ending block.

9. The reading teaching aid assembly of claim 1, wherein sliding the vowel card is configured to slide along the vowel track in a left-to-right direction; wherein the starting block is positioned at a left track side of the vowel track; and wherein the ending block is positioned at a right track side of the vowel track.

10. The reading teaching aid assembly of claim 1, wherein:
    the vowel track defines a top track side and a bottom track side disposed opposite from the top track side;
    the starting block extends along the top track side; and
    the ending block extends along the bottom track side.

11. The reading teaching aid assembly of claim 1, wherein:
    the plurality of starting cells comprises a plurality of first starting cells and a plurality of second starting cells;
    each first starting cell of the plurality of first starting cells contains an extendable consonant sound; and
    each second starting cell of the plurality of second starting cells contains an un-extendable consonant sound.

12. The reading teaching aid assembly of claim 1, wherein a wing is aligned adjacent to the first ending cell, the wing attached to the vowel card, the wing positioned to the right of the first ending cell.

13. The reading teaching aid assembly of claim 12, wherein the starting consonant defines an extendable consonant sound.

14. The reading teaching aid assembly of claim 12, wherein the ending consonant defines an extendable consonant sound.

15. The reading teaching aid assembly of claim 12, wherein a card is aligned adjacent to the first ending cell to cover a second ending cell of the plurality of ending cells, the second ending cell positioned adjacent to the first ending cell.

16. The reading teaching aid assembly of claim 15, wherein an ending vowel is configured to be pronounced after pronouncing the ending consonant, the ending vowel defined on the card, the ending vowel positioned adjacent to the first ending cell.

17. The reading teaching aid assembly of claim 12, wherein the vowel card is configured to slide along the vowel track away from the starting block and towards the ending block.

18. The reading teaching aid assembly of claim 12, wherein the vowel card is configured to slide along the vowel track in a left-to-right direction; wherein the starting block is positioned at a left track side of the vowel track; and wherein the ending block is positioned at a right track side of the vowel track.

19. The reading teaching aid assembly of claim 12, wherein:
    the vowel track defines a top track side and a bottom track side disposed opposite from the top track side;
    the starting block extends along the top track side; and
    the ending block extends along the bottom track side.

20. The reading teaching aid assembly of claim 12, wherein:
    the plurality of starting cells comprises a plurality of first starting cells and a plurality of second starting cells;
    each first starting cell of the plurality of first starting cells contains an extendable consonant sound; and
    each second starting cell of the plurality of second starting cells contains an un-extendable consonant sound.

* * * * *